United States Patent
Higashiyama et al.

(10) Patent No.: US 7,524,106 B2
(45) Date of Patent: Apr. 28, 2009

(54) ABNORMALITY DIAGNOSIS APPARATUS AND METHOD FOR WATER TEMPERATURE SENSOR

(75) Inventors: Norikazu Higashiyama, Chiryu (JP); Koichi Satoya, Susono (JP); Koichi Mizutani, Torrance, CA (US)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 143 days.

(21) Appl. No.: 11/260,321

(22) Filed: Oct. 28, 2005

(65) Prior Publication Data
US 2006/0093014 A1    May 4, 2006

(30) Foreign Application Priority Data
Oct. 29, 2004    (JP)    ............................. 2004-315179

(51) Int. Cl.
G01K 15/00 (2006.01)
G01K 7/00 (2006.01)
F01P 7/16 (2006.01)

(52) U.S. Cl. ................... 374/145; 374/1; 374/E15.001; 701/34; 702/116; 702/130; 73/114.68; 123/41.15; 123/41.05

(58) Field of Classification Search ............ 374/1, 374/144, 145, E15.001; 701/34; 702/116, 702/130; 73/114.68; 123/41.15, 41.05
See application file for complete search history.

(56) References Cited

U.S. PATENT DOCUMENTS

| | | | | | |
|---|---|---|---|---|---|
| 4,069,712 | A | * | 1/1978 | Armstrong et al. | 73/118.1 |
| 5,153,835 | A | * | 10/1992 | Hashimoto et al. | 701/114 |
| 5,235,527 | A | * | 8/1993 | Ogawa et al. | 702/116 |
| 5,491,631 | A | * | 2/1996 | Shirane et al. | 701/35 |
| 5,526,871 | A | * | 6/1996 | Musser et al. | 165/11.1 |
| 5,617,337 | A | * | 4/1997 | Eidler et al. | 702/104 |
| 5,884,243 | A | * | 3/1999 | Taniguchi et al. | 702/183 |
| 5,995,887 | A | * | 11/1999 | Hathaway et al. | 701/34 |
| 6,128,948 | A | * | 10/2000 | Shi et al. | 73/118.1 |
| 6,200,021 | B1 | * | 3/2001 | Mitsutani et al. | 374/1 |

(Continued)

FOREIGN PATENT DOCUMENTS

EP    0 816 960 A2    1/1998

(Continued)

OTHER PUBLICATIONS

European Search Report dated Jan. 18, 2007.

*Primary Examiner*—Gail Verbitsky
*Assistant Examiner*—Mirellys Jagan
(74) *Attorney, Agent, or Firm*—Kenyon & Kenyon LLP (57) ABSTRACT

There are occasions when an intermittent abnormality occurs in a water temperature sensor that is of a type that does not cause a sudden change in a detection value of the water temperature sensor. The movement of the detection value of the water temperature sensor when this type of abnormality occurs may be, for example, a movement in which the detection value of the water temperature sensor becomes lower even through warm up has been proceeding after engine start up has begun. When this type of movement of the detection value occurs, if the detection value of the water temperature sensor reduces, after engine start up has begun, to a value lower than that when start up began, it is immediately determined based on this fact that an abnormality of the water temperature sensor is occurring.

4 Claims, 6 Drawing Sheets

U.S. PATENT DOCUMENTS

| | | | |
|---|---|---|---|
| 6,279,390 B1 * | 8/2001 | Oka et al. | 73/118.1 |
| 6,421,625 B1 * | 7/2002 | Cianciara et al. | 702/130 |
| 6,463,892 B1 * | 10/2002 | Russell | 123/41.15 |
| 6,615,647 B2 * | 9/2003 | Niki | 73/118.1 |
| 6,684,154 B2 * | 1/2004 | Isobe et al. | 701/114 |
| 6,732,025 B2 * | 5/2004 | Reese et al. | 701/29 |
| 6,752,011 B2 * | 6/2004 | Matsumoto et al. | 73/119 R |
| 6,907,343 B2 * | 6/2005 | Tsukamoto et al. | 701/114 |
| 6,952,953 B2 * | 10/2005 | Plote et al. | 73/119 R |
| 7,087,671 B2 * | 8/2006 | Okamura et al. | 524/496 |
| 2004/0168510 A1 * | 9/2004 | Wakahara et al. | 73/118.1 |
| 2004/0184507 A1 * | 9/2004 | Tsukamoto et al. | 374/57 |
| 2006/0093014 A1 * | 5/2006 | Higashiyama et al. | 374/1 |
| 2006/0120430 A1 * | 6/2006 | Bayerle et al. | 374/1 |

FOREIGN PATENT DOCUMENTS

| | | |
|---|---|---|
| JP | 64-41642 A | 2/1989 |
| JP | 1-178747 A | 7/1989 |
| JP | 4-11239 | 1/1992 |
| JP | 11-173149 A | 6/1999 |
| JP | 11-200940 A | 7/1999 |
| WO | WO 2004/089667 A1 | 10/2004 |

* cited by examiner

FIG. 5A
WARM UP COUNTER C

FIG. 5B
INTAKE AIR TEMPERATURE

FIG. 5C
COOLANT TEMPERATURE
(DETECTION VALUE OF WATER TEMPERATURE SENSOR)

FIG. 6

FIG. 7

ABNORMALITY DIAGNOSIS APPARATUS AND METHOD FOR WATER TEMPERATURE SENSOR

INCORPORATION BY REFERENCE

The disclosure of Japanese Patent Application No. 2004-315179 filed on Oct. 29, 2004, including the specification, drawings and abstract is incorporated herein by reference in its entirety.

BACKGROUND OF THE INVENTION

1. Field of the Invention

The invention relates to an abnormality diagnosis apparatus and an abnormality diagnosis method for a water temperature sensor.

2. Description of the Related Art

In a water temperature sensor for detecting a coolant temperature in an internal combustion engine, in addition to continuous abnormalities such as disconnections, shorts, or the like, intermittent abnormalities such as repetitive switching between a normal and an abnormal state also occur. There is strong demand for the development of technology that can determine whether such intermittent abnormalities are taking place. To address this demand, attention has been focused on sudden changes that occur in a detection value of the water temperature sensor when there is an abnormality, such as in the technology disclosed in Japanese Patent Laid-open Publication No. JP-A-11-173149 (specifically, paragraphs [0051], [0053]). Such sudden changes in the detection value can be used as a basis for making a determination as to whether an intermittent abnormality is occurring in the water temperature sensor.

However, it is not the case that sudden changes occur in the detection value every time there is an intermittent abnormality of the water temperature sensor. Depending on the type of intermittent abnormality, for example, the effect of the abnormality may appear in the form that, there is a difference between (i) a movement of an actual coolant temperature, and (ii) a movement of the detection value of the water temperature sensor, even though the detection value generally changes gradually along with change in the actual coolant temperature. In this situation, no sudden change in the detection value of the water temperature sensor accompanies the abnormality. Accordingly, if abnormality diagnosis of the water temperature sensor is performed in a manner like that disclosed in Japanese Patent Laid-open Publication No. JP-A-11-173149, it is not possible to determine whether an abnormality is occurring in the water temperature sensor.

Further, types of abnormality diagnosis have been disclosed in which it is determined that an abnormality is occurring in the water temperature sensor based on whether or not a detection value of the water temperature sensor has reached a predetermined reference value at a time point when sufficient time has elapsed for warm up to be completed since engine start up began (for example, refer to Japanese Patent Laid-open Publication No. JP-A-11-200940 (specifically, paragraph [0006]).

In this abnormality diagnosis, a comparatively long time period is provided and ensured to allow for completion of warm up. This long time period is provided and ensured so that, even in the case of a very slight abnormality in which the output characteristics of the water temperature sensor only diverge very slightly from a normal state, it is possible to detect that the abnormality is occurring. Thus, if an intermittent abnormality of the water sensor is occurring, the effect of the abnormality will be noticeably apparent in the detection value of the water temperature sensor at the time point when the time necessary for warm up has elapsed. More specifically, the detection value of the water temperature sensor resulting from the abnormality becomes lower than the reference value. As a result, even in the case of types of abnormality which do not cause a sudden change of the detection value of the water temperature sensor, it is possible to determine that an abnormality is occurring based on the fact that the detection value of the water temperature sensor has become lower than the reference value at the time point when the time necessary for warm up has elapsed.

However, in the abnormality diagnosis disclosed in Japanese Patent Laid-open Publication No. JP-A-11-200940, it is necessary to provide and ensure the comparatively long time period until the time necessary for the completion of warm up has elapsed after the beginning of engine start up. As a result, it is not possible to determine whether an abnormality of the water temperature sensor is occurring until this time has elapsed, and thus making the abnormality determination requires a period of time.

SUMMARY OF THE INVENTION

It is an object of the invention to provide an abnormality diagnosis apparatus and an abnormality diagnosis method for a water temperature sensor that can accurately determine that an abnormality is occurring in a short period after engine start up has begun, in the case that an intermittent abnormality of the water temperature sensor occurs that is of a type that does not cause a detection value of the water temperature sensor to change suddenly.

According to a first aspect of the invention, an abnormality diagnosis apparatus for a water temperature sensor that detects a coolant temperature of an internal combustion engine is provided with a controller that determines whether an abnormality of the water temperature sensor is occurring based on if, after start up of the internal combustion engine begins, a detection value of the water temperature sensor has become a value lower than that when start up began.

There are occasions when an intermittent abnormality of the water temperature sensor occurs that is of a type that does not cause the detection value of the water temperature sensor to change suddenly. The movement of the detection value of the water temperature sensor when this type of abnormality is occurring may be, for example, a movement in which the detection value of the water temperature sensor becomes lower even though warm up has been proceeding after start up of the internal combustion engine has begun. With the above described configuration, if the detection value of the water temperature sensor moves as described above and becomes lower, after the beginning of engine start up, than a value when start up began, it is immediately determined based on this fact that an abnormality of the water temperature sensor is occurring. Accordingly, when an intermittent abnormality of the water temperature sensor occurs that is of a type that does not cause the detection signal of the water temperature sensor to change suddenly, it is possible to accurately determine that the abnormality is occurring in a short period of time after engine start up has begun.

According to a second aspect of the invention, the first aspect of the invention is configured such that the abnormality determination of the controller is only performed when a change amount of an intake air temperature of the internal combustion engine is small.

There is a special circumstance in which the intake air temperature suddenly falls due to a sudden reduction in the air temperature surrounding the internal combustion engine after start up. In this special circumstance, even if an abnormality is not occurring in the water temperature sensor, it is conceivable that the detection value of the water temperature sensor will reduce even though warm up is proceeding after start up of the internal combustion engine has begun. According to the above described configuration, the abnormality determination of the controller is only performed when the change amount of the intake air temperature is small, namely, is only performed when the above special circumstance does not exist. Accordingly, it is possible to avoid making a mistaken determination that an abnormality is occurring in the water temperature sensor, which would occur if the abnormality processing were performed in the special circumstance.

According to a third aspect of the invention, an abnormality diagnosis apparatus for a water temperature sensor that detects a coolant temperature of an internal combustion engine, includes a controller that determines whether an abnormality of the water temperature sensor is occurring based on if a detection value of the water temperature sensor has become a value lower than an intake air temperature after start up of the internal combustion engine has begun.

There are occasions when an intermittent abnormality of the water temperature sensor occurs that is of a type that does not cause the detection value of the water temperature sensor to change suddenly. The movement of the detection value of the water temperature sensor when this type of abnormality occurs may be, for example, a movement in which, after start up of the internal combustion engine has begun, the detection value of the water temperature sensor becomes lower than the intake air temperature at that time. Note that, the internal combustion engine intakes surrounding air and combusts it along with fuel. Thus, normally, the coolant temperature of the internal combustion engine does not become lower than the intake air temperature, and the above described movement of the detection value is not observed so long as the water temperature sensor is functioning normally. According to the above described configuration, in the case that the detection value of the water temperature sensor moves as described above after start up of the internal combustion engine has begun, and the detection value of the water temperature sensor becomes lower than the intake air temperature at that time after engine start up has begun, it is immediately determined based on this fact that an abnormality of the water temperature sensor is occurring. Accordingly, when an intermittent abnormality of the water temperature sensor occurs that is of a type that does not cause the detection value of the water temperature sensor to change suddenly, it is possible to accurately determine that the abnormality is occurring in a short period of time after engine start up has begun.

According to a fourth aspect of the invention, an abnormality diagnosis apparatus for a water temperature sensor that detects a coolant temperature of an internal combustion engine includes a controller that determines whether an abnormality of the water temperature sensor is occurring based on if a change amount of the detection value of the water temperature sensor per unit time has become equal to or less than a predetermined negative value after start up of the internal combustion engine has begun.

There are occasions when an intermittent abnormality of the water temperature sensor occurs that is of a type that does not cause the detection value of the water temperature sensor to change suddenly. The movement of the detection value of the water temperature sensor when this type of abnormality occurs may be, for example, a movement in which the detection value of the water temperature sensor becomes lower even though warm up has been proceeding after start up of the internal combustion engine has begun. With the above described configuration, in the case that the detection value of the water temperature sensor moves as described above after engine start up has begun, and the change amount (negative value) of the detection value per unit time becomes equal to or less than the predetermined negative value, it is immediately determined based on this fact that an abnormality of the water temperature sensor is occurring. Accordingly, when an intermittent abnormality of the water temperature sensor occurs that is of a type that does not cause the detection signal of the water temperature sensor to change suddenly, it is possible to accurately determine that the abnormality is occurring in a short period of time after engine start up has begun.

According to a fifth aspect of the invention, the fourth aspect of the invention is configured such that the predetermined negative value is set to a value that is smaller than the smallest value that might conceivably be obtained for the change amount of the detection value of the water temperature sensor per unit time when the coolant temperature reduces due to decrease of an intake air temperature.

As described above, there is a special circumstance in which the intake air temperature suddenly falls due to a sudden reduction in the air temperature surrounding the internal combustion engine after start up. In this special circumstance, even if an abnormality has not occurred in the water temperature sensor, it is conceivable that the detection value of the water temperature sensor will reduce even though warm up is proceeding after start up of the internal combustion engine has begun. However, as a result of setting the predetermined negative value as described above, even if the detection value of the water temperature sensor reduces while warm up is proceeding due to the special circumstance, the change amount (negative value) of the detection value does not reduce to less than the predetermined negative value. Accordingly, it is possible to avoid making the mistaken determination at that time that an abnormality of the water temperature sensor is occurring. On the other hand, there are occasions when the detection value of the water temperature sensor becomes smaller while warm up is proceeding due to an abnormality. In this case, it is determined that an abnormality of the water temperature sensor is occurring when the change amount (negative value) of the detection value reduces to less than the predetermined negative value.

According to a sixth aspect of the invention, any one of the first to fifth aspects of the invention is configured such that, in addition to the abnormality determination, the controller determines whether an abnormality of the water temperature sensor is occurring based on if the detection value of the water temperature sensor changes suddenly.

According to the above described configuration, in the case of an intermittent abnormality of the water temperature sensor that is of a type that does not cause the detection value of the water temperature sensor to change suddenly, the abnormality diagnosis of the controller makes it possible to determine whether such an abnormality is occurring in the water temperature sensor. Further, in the case of an intermittent abnormality that is of a type that does cause the detection value of the water temperature sensor to change suddenly, it is possible to determine whether such an abnormality of the water temperature sensor is occurring. Accordingly, regardless of whether an intermittent abnormality of the water temperature sensor is (i) a type of abnormality that does not cause sudden change in the detection value of the water temperature sensor, or (ii) is a type of abnormality that does cause sudden change of the detection value of the water temperature sensor, it is possible to accurately determine whether any of these abnormalities is occurring in a short period of time after engine start up has begun.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Hereinafter, an embodiment of an abnormality diagnosis apparatus for a water temperature sensor of an engine of a vehicle to which the invention is concretely applied will be described with reference to FIGS. 1 to 7.

Figure 1:
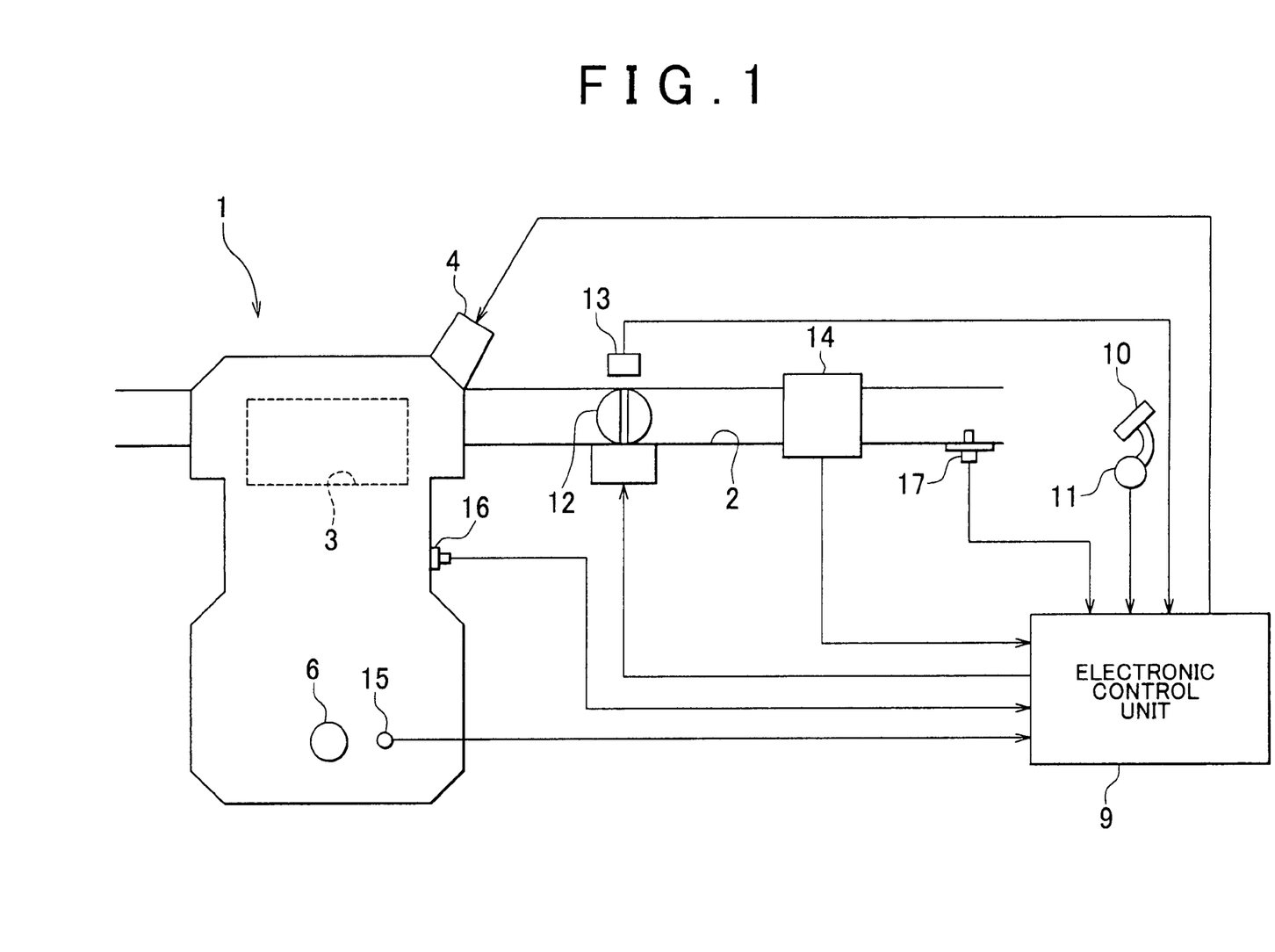
FIG. 1 shows a schematic overall view of an engine to which an abnormality diagnosis apparatus for a water temperature sensor of an embodiment is applied.

In an engine 1 shown in FIG. 1, an amount of air intake (an intake air amount) to a combustion chamber 3 is adjusted by controlling an opening degree of a throttle valve 12 provided in an intake passage 2. An amount of fuel that corresponds to this intake air amount is injected to the combustion chamber 3 from a fuel injection valve 4. When the air-fuel mixture formed by the fuel and air is ignited in the combustion chamber 3, the air-fuel mixture is combusted so as to drive the engine 1 and rotate a crank shaft 6.

An electronic control unit 9 mounted in the vehicle performs various types of control for the engine 1. The electronic control unit 9 includes a CPU that executes various types of calculation processing related to control of the engine 1; a ROM that stores programs, data and the like necessary for this control, a RAM that temporarily stores the calculation results of the CPU; and input and output ports that enable input and output of signals between the CPU and external devices.

A variety of sensors, described below, are connected to the intake port of the electronic control unit 9. These sensors include:

(i) an accelerator position sensor 11 that detects a depression amount (an accelerator depression amount) of an accelerator pedal 10 that is operated by being depressed by a user of the vehicle;
(ii) a throttle position sensor 13 that detects an opening degree of the throttle valve 12 (a throttle opening degree);
(iii) an air flow meter 14 that detects the amount of air intake to the combustion chamber 3 from the intake passage 2;
(iv) a crank position sensor 15 that outputs a signal corresponding to rotation of the crank shaft 6 that is used in calculation of an engine rotational speed, etc.;
(v) a water temperature sensor 16 that detects a coolant temperature of the engine 1; and
(vi) an intake air temperature sensor 17 that detects a temperature of the air intake (intake air temperature) to the combustion chamber 3 from the intake passage 2.

On the other hand, respective drive circuits of the fuel injection valve 4 and the throttle valve 12 are connected to the output port of the electronic control unit 9.

The electronic control unit 9 detects an engine operating state that is established based on detection signals input from the respective sensors. The electronic control unit 9 outputs a command signal to each of the drive circuits connected to the output port in accordance with the engine operating state. In this way, the electronic control unit 9 enables performance of (i) control of a fuel injection amount of the fuel injection valve 4, and (ii) control of the opening degree of the throttle valve 12.

The fuel injection amount control of the engine 1 is performed such that the fuel injection valve 4 is driven and controlled so that an amount of fuel injected from the fuel injection valve 4 corresponds to an amount of air intake to the combustion chamber 3 from the intake passage 2 during one cycle. The drive and control of the fuel injection valve 4 is based upon an air charge efficiency that is a parameter indicating the amount of air, and the like. For example, during idle operation of the engine 1, fuel injection of the fuel injection valve 4 is controlled by the fuel injection amount control such that the air-fuel ratio of the air-fuel mixture is a stoichiometric air-fuel ratio.

The air charge efficiency used in the fuel injection amount control is a ratio of the volume of the air intake to the combustion chamber 3 from the intake passage 2 during one cycle with respect to a maximum volume of the combustion chamber 3. The air charge efficiency is calculated based on (a) parameters that influence the amount of air intake to the combustion chamber 3 from intake passage 2 during one cycle, such as the intake air amount of the engine 1, the throttle opening degree, and the accelerator depression amount, and the like, and (b) the engine rotational speed.

Opening degree control of the throttle valve 12 is performed in order to adjust the air intake amount of the engine 1, or, more specifically, the air charge efficiency thereof. In this opening degree control, the air flow area of the intake passage 2 is changed. For the opening degree control of the throttle valve 12 an idle speed control (ISC) is performed in which the throttle valve degree is adjusted such that, during idle operation of the engine 1, the engine rotational speed is caused to converge on a target idle rotation speed that is set in advance. Note that, the reason why the engine rotational speed can be changed by adjusting the throttle opening degree is as follows. In the engine 1, when the air charge efficiency is adjusted by changing the throttle opening degree, an amount of fuel corresponding to the air charge efficiency at the time is injected and supplied, whereby the amount of the air-fuel mixture formed by the air and fuel that is charged to the combustion chamber 3 is changed. As a result, the engine rotational speed of the engine 1 driven by combustion energy of the air-fuel mixture is changed.

In the idle speed control, the throttle opening degree is adjusted using an ISC correction amount so as to obtain the air charge efficiency that is necessary to maintain the engine rotational speed at the target idle rotational speed during idle operation. The ISC correction amount is a value that adjusts the throttle opening degree in either an opening or closing direction. This is achieved by increasing or reducing the ISC correction amount based on the engine operating state, such as the coolant temperature, and the engine rotational speed.

Further, when the engine rotational speed is being increased towards the target engine rotational speed during idle operation, the ISC correction amount is set to a large value such that the throttle opening degree is adjusted in the opening direction. Accordingly, the air charge efficiency of the engine 1 is increased. Further, when the air charge efficiency is increased, the fuel injection amount is increased, whereby the amount of air-fuel mixture changed to the combustion chamber 3 increases. As a result, the engine rotational speed increases. On the other hand, when the engine rotational speed is decreased toward the target engine rotational speed, the ISC correction amount is set to a smaller value such that the throttle opening degree is adjusted in the closing direction. Accordingly, the air charge efficiency of the engine 1 is decreased. Further, when the air charge efficiency is decreased, the fuel injection amount is decreased, whereby the amount of air-fuel mixture changed to the combustion chamber 3 decreases. As a result, the engine rotational speed decreases.

Note that, the ISC correction amount is also increased and decreased in accordance with the coolant temperature during idling operation, and is set, for example, to a larger value as a detection value (coolant temperature) of the water temperature sensor 16 becomes lower. This is because as the coolant temperature becomes lower, the amount of air-fuel mixture necessary to perform stable operation increases. In order to satisfy this requirement, as the coolant temperature becomes lower, it is necessary to control the throttle opening degree so that it change in the opening direction. Further, since the ISC correction amount is changed based on the coolant temperature during the idle speed control, an increase or decrease amount of the fuel injection amount when increase or decrease of the fuel injection amount is carried out in accordance with the air charge efficiency is also changed by the coolant temperature.

Next, an abnormality diagnosis procedure for the water temperature sensor 16 will be described with reference to a flow chart in FIGS. 2 and 3 that shows a water temperature sensor abnormality diagnosis routine. This water temperature sensor abnormality diagnosis routine is performed by the electronic control unit 9 using, for example, an interrupt executed at predetermined time intervals.

Figure 2:
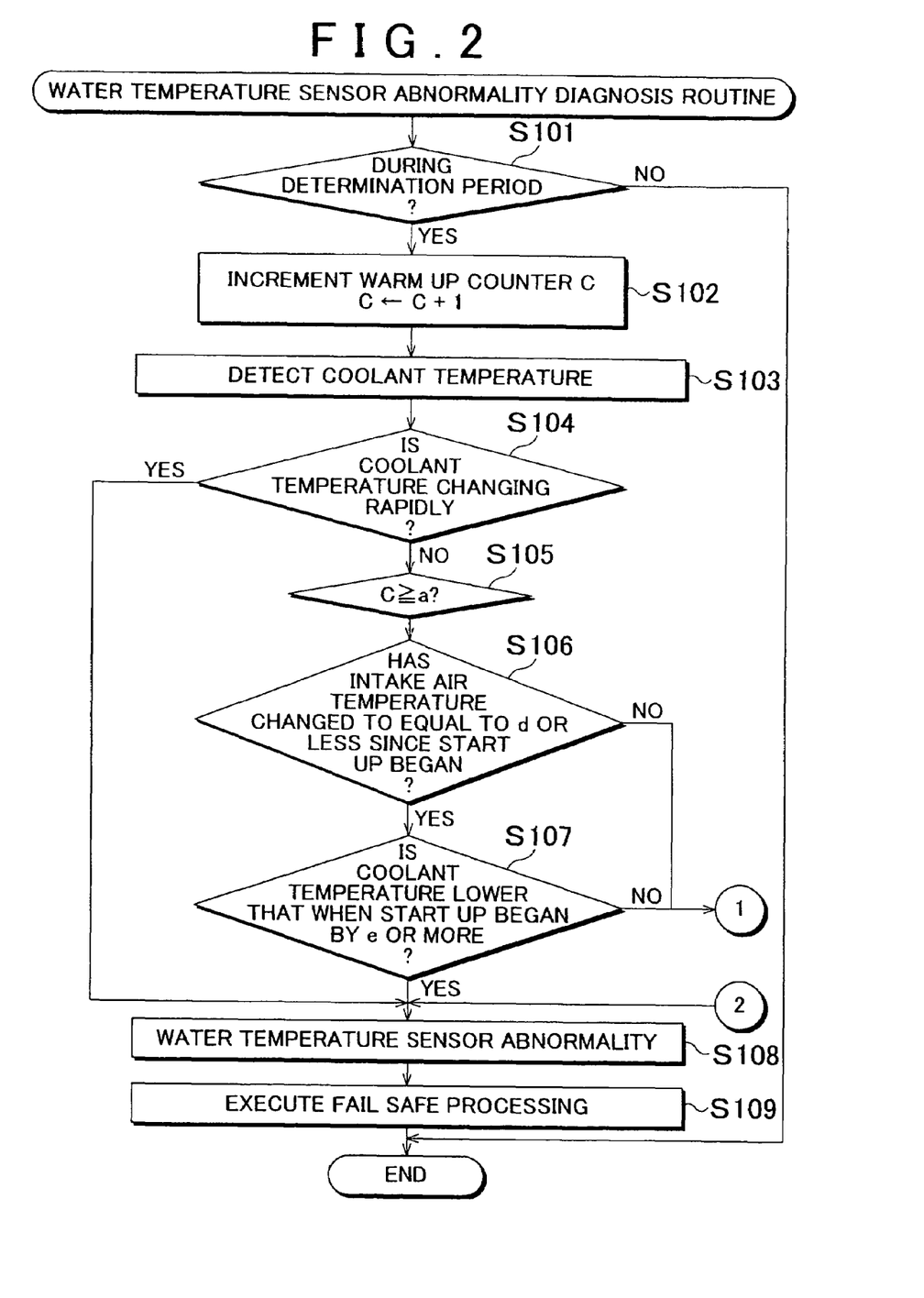
FIG. 2 is a flow chart illustrating an abnormality diagnosis procedure for the water temperature sensor.
Figure 3:
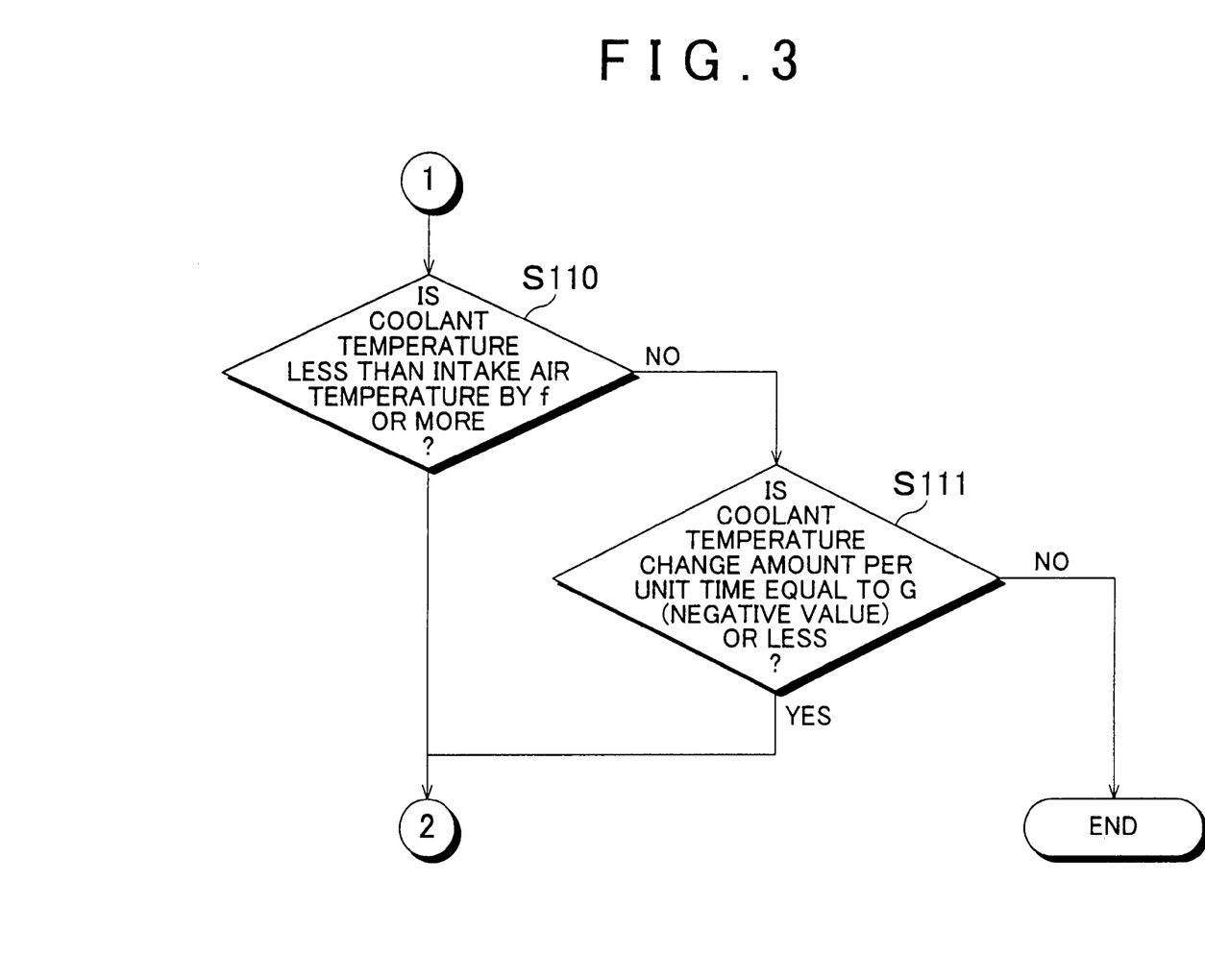
FIG. 3 is a flow chart illustrating the abnormality diagnosis procedure for the water temperature sensor.

In this routine, first, it is determined whether the abnormality diagnosis for the water temperature sensor 9 is presently being performed, namely, whether it is a determination period (S101, FIG. 2). As this determination period, for example, it is possible to set a period of time from when the engine 1 is started until when a maximum time period required for completion of warm up has elapsed. If it is determined that it is presently the determination period (YES in S101), an increment is added to a warm up counter C that indicates an elapsed time since start up (S102). This warm up counter C is provided to measure the elapsed time since start up of the engine 1 began, and is reset to "0" when the engine 1 stops.

Next, the detection of the coolant temperature is executed based on the detection value of the water temperature sensor 16 (S103).

In the processing of the following step S104, it is determined whether an intermittent abnormality is occurring in the water temperature sensor 16, for example, whether the water temperature sensor 16 is repeatedly switching between a normal state and an abnormal state.

Figure 4:
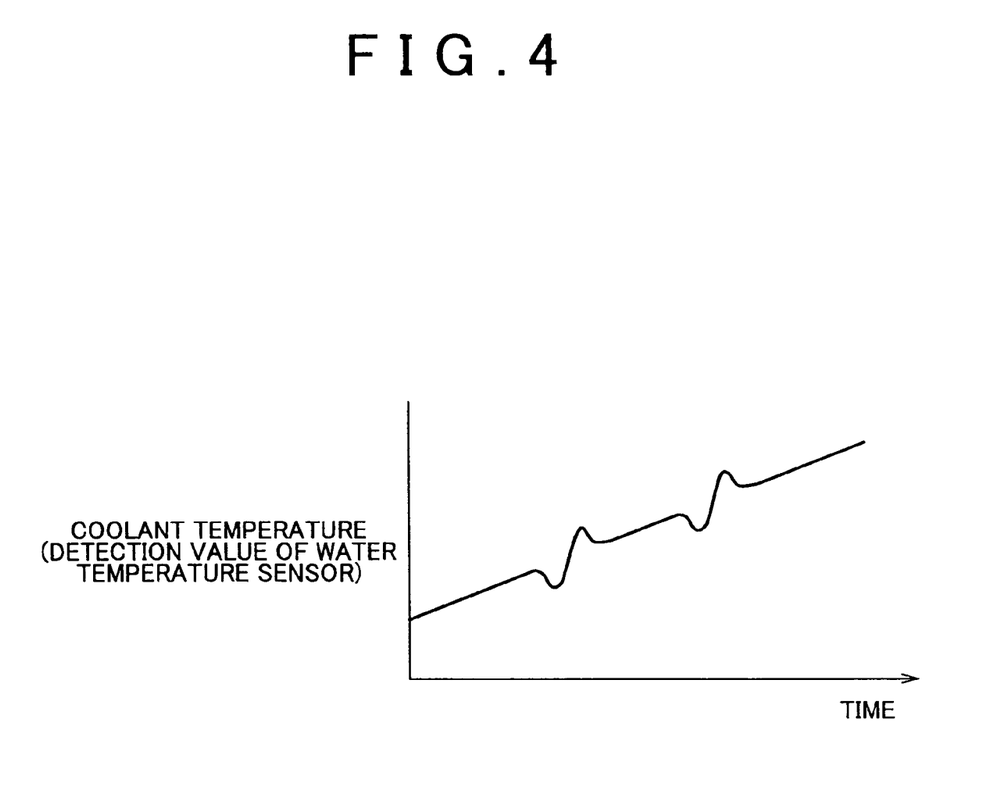
FIG. 4 is a graph showing how a detection value of the water temperature sensor moves when an intermittent abnormality of the water temperature sensor occurs that is of a type that causes sudden change in the detection value of the water temperature sensor.

In the case that such an intermittent abnormality is occurring, a phenomenon in which the detection value (the coolant temperature) of the water temperature sensor 16 changes suddenly, for example, in the form shown in FIG. 4, can be observed. Given this fact, when determining whether an intermittent abnormality is occurring in step S104, it is determined whether the coolant temperature detected by the water temperature sensor 16 has changed suddenly. More specifically, the determination is made based on whether the Equation (1) below is satisfied or not:

$$\Delta THW/\Delta t \geq C1 \quad (1)$$

where, "$\Delta THW$" is an absolute value of a difference between a coolant temperature THW1 detected by the processing of step S103 this time and a coolant temperature THW2 detected by the processing of step S103 last time; and "$\Delta t$" is a time corresponding to an execution interval of the water temperature sensor abnormality diagnosis routine. Accordingly, "$\Delta THW/\Delta t$" of the left side of Equation (1) expresses a change amount of the coolant temperature (the detection value of the water temperature sensor 16) per each unit time. In the case that this change amount ("$\Delta THW/\Delta t$") is equal to or above a predetermined value C1, it is determined that the detection value of the water temperature sensor 16 has changed suddenly (YES in S104). Note that, the predetermined value C1 may be set as, for example, a large value that would not normally be observed in the change amount per unit time of the detection value of the water temperature sensor 16.

In the determination of step S104 is positive, it is determined that an abnormality is occurring in the water temperature sensor 16 (S108). In the case a positive determination is made, the occurrence of the abnormality in the water temperature sensor 16 is addressed by, for example, (a) storing "1 (abnormality present)" as a flag corresponding to the presence of the abnormality in a predetermined region of the nonvolatile RAM provided in the electronic control unit 9, and (b) issuing a warning to the user of the vehicle that an abnormality has occurred by flashing a warning light or the like.

Further, when an abnormality of the water temperature sensor 16 occurs, there are occasions when, for example, the detection value thereof becomes lower than an appropriate value. In this case, the ISC correction amount is set excessively large to a corresponding degree, and becomes a value at which the throttle opening degree is increased excessively in the opening direction. As a result, when the engine rotational speed increases towards the target engine rotational speed, the air filling efficiency of the engine 1 is increased excessively, whereby the increase amount of the fuel injection amount is made excessively large. Accordingly, it is likely that the engine rotational speed will become a value higher than the target engine rotational speed. In step S109, a fail safe process is executed to inhibit such increase of the engine rotational speed above the target engine rotational speed.

For the fail safe process, one of the following processes may be performed.

(a) The ISC correction amount used in the idle speed control may be limited to a value equal to or less than a predetermined value C2. At the same time, the increase amount of the fuel injection amount when the engine rotational speed is increased toward the target engine rotational speed in the idle speed control may be limited to equal to or less than a predetermined valve C3. Note that, the predetermined values C2 and C3 are values which have been determined in advanced based on experimentation or the like, and which inhibit the increase of the engine rotational speed.

(b) An appropriate coolant temperature may be estimated in advance based upon the warm up counter C, the coolant temperature when engine start up was begun, the intake air temperature, and the like. The estimated coolant temperature may then be used to determined the ISC correction amount used in the idle speed control and the increase amount of the fuel injection amount.

However, when an abnormality occurs in the water temperature sensor 16, it is not always the case that a sudden change in the detection value takes place. More specifically, depending on the type of intermittent abnormality, for example, the effect of the abnormality may appear in the form that, following the beginning of start up of the engine 1, the movement of the detection value of the water temperature sensor 16, although generally changing gradually along with change of the actual coolant temperature, is different to an appropriate movement thereof. In this situation, no sudden change in the detection value of the water temperature sensor accompanies the abnormality. Thus, the determination made in step S104 is not positive, and accordingly it is determined that no abnormality is occurring in the water temperature sensor 16.

Given this, the routine includes steps S105 to S107 (FIG. 2) and steps S110 and S111 (FIG. 3) that are performed when the determination of step S104 is negative. In steps S105 to S107, it is determined whether or not an abnormality is present that (i) is an intermittent abnormality of the water temperature sensor 16, and (ii) has a type that does not cause sudden change in the detection value of the water temperature sensor 16. In this series of processing steps, the determinations described in [1] to [3] below are made on the condition that start up of the engine 1 has begun, or, more specifically, that the value of the warm up counter C is equal to or above a predetermined value "a".

[1] In the case that the change in the intake air temperature of the engine 1 is small, it is determined whether the value of the detection value of the water temperature sensor 16 has become a value less than the value when start up began (S106, S107).

[2] It is determined whether the coolant temperature detected by the water temperature sensor 16 has a value lower than the value of the intake air temperature (S110).

[3] It is determined whether the change amount of the coolant temperature per unit time is equal to or less than a predetermined negative value "g" (S111).

In the case that any one the determinations in [1] to [3] are positive, the routine immediately proceeds to determine that an abnormality of the water temperature sensor 16 is occurring (S108), following which the fail safe process is performed (S109). As a result of the above described processing, it is possible to accurately determine that an abnormality is occurring during the short period of time after engine start up is begun in the case that an abnormality is occurring that (a) is an intermittent abnormality of the water temperature sensor 16, and (b) has a type that does not cause sudden change in the detection value of the water temperature sensor 16. In addition, the fail safe process that addresses the abnormality can be performed as a countermeasure.

Next, the determinations described in [1] to [3] will be explained separately in more detail. More specifically, a description will be given about the reason why it can be determined that an abnormality of the water temperature sensor 16 is occurring based on the fact that there is a positive determination in any one of the determinations described in [1] to [3].

(i) Explanation of Determination [1]

One example of the movement of the detection value of the water temperature sensor 16 when an abnormality like that described above is occurring in the water temperature sensor 16 is a movement in which the detection value of the water temperature sensor 16 becomes lower even though warm up is proceeding following the beginning of start up of the engine 1. The solid lines L1 and L2 in FIG. 5C illustrate examples of this type of movement of the detection value of the water temperature sensor 16. In both of the example movements of the detection value illustrated by the solid lines L1 and L2 in FIG. 5C, the detection value continues to reduce following the begin of engine start up.

In the case that the detection value of the water temperature sensor 16 moves in a manner like those described above, at a time point when the value of the warm up counter C reaches the predetermined value "a" following the beginning of engine start up, there is a high likelihood that the detection value of the water temperature sensor 16 will be lower than its value at the time that start up began. Accordingly, when the coolant temperature at this time (the detection value of the water temperature sensor 16) is lower than its value when engine start up began, it is possible to determine that an abnormality like that described above is occurring in the water temperature sensor 16. Note that, the predetermined value "a" adopted may be, for example, a value that corresponds to the time necessary for change of the actual coolant temperature to become apparent following the beginning of start up of the engine 1. This value may be derived in advance by experimentation or the like. Accordingly, the time until when the value of the warm up counter C reaches the predetermined value "a" may be a time that is much shorter than the time until when engine warm up is completed.

Given this, in step S107 of the water temperature sensor abnormality diagnosis routine, it is determined whether the detection value of the water temperature sensor 16 is less than the value at the time of engine start up by a predetermined value "e" or more. This determination is made to enable determination of the presence or not of the occurrence of the above described abnormality in the water temperature sensor 16. In the case that a positive determination is made in step S107, it can be determined that an intermittent abnormality is occurring in the water temperature sensor 16 and that this abnormality is of a type that does not cause the detection value of the water temperature sensor 16 to change suddenly. Note that, the predetermined value "e" is a chosen value equal to or above "0", and is preset based on experimentation etc. to a value that is optimal from the point of view of performing the above described determination. Further, in the case that a positive determination is made in step S107, the routine immediately proceeds to step S108, where it is determined that an abnormality of the water temperature sensor 16 is occurring. Following this, the fail safe processing of step S109 is performed.

Figure 5A:
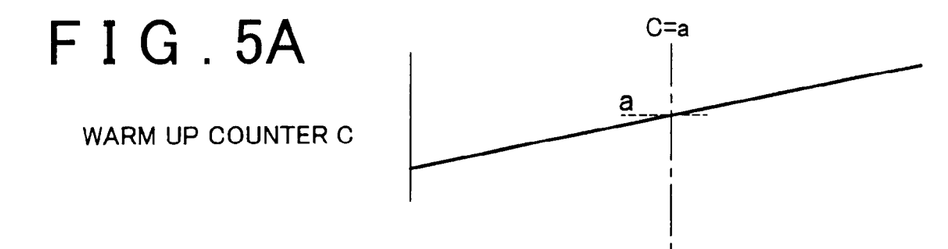
FIGS. 5A to 5C are time charts showing how a warm up counter, an intake air temperature, and a coolant temperature (the detection value of the water temperature sensor) move along with elapse of time when an abnormality of the water temperature sensor occurs.
Figure 5B:
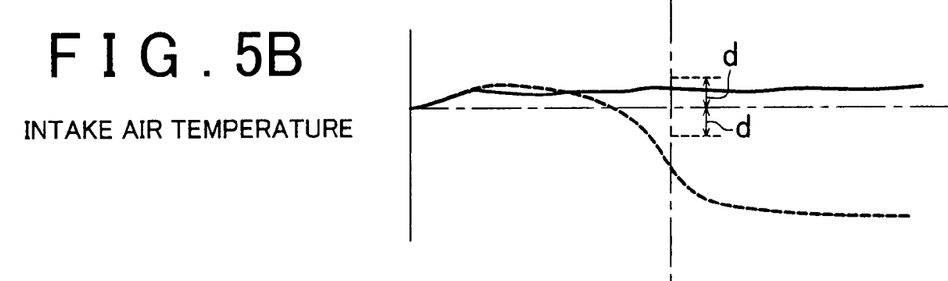
Figure 5C:
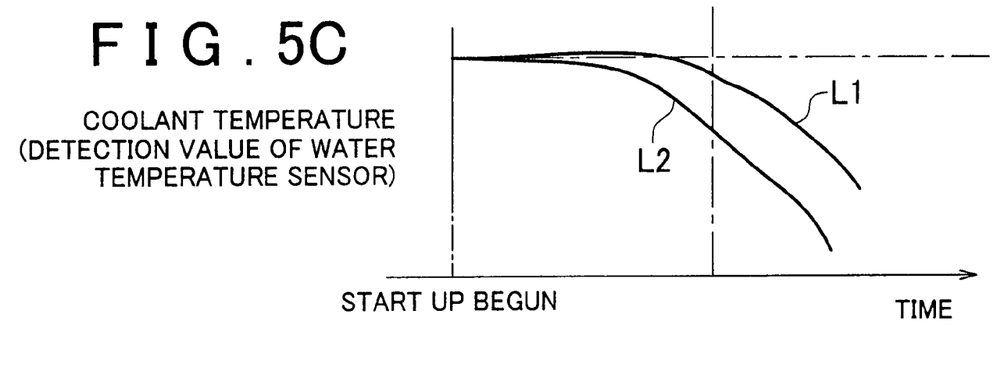

However, there is a special circumstance when, as a result of a sudden fall in the air temperature surrounding the engine 1 after start up (such as when the vehicle is driven out of a garage in the winter), the intake air temperature suddenly falls as illustrated by the dashed line shown in FIG. 5B. In this special circumstance, it is possible that, even if the water temperature sensor 16 is functioning normally, the movement of the detection value of the water temperature sensor 16 will move in a manner like that illustrates by the solid lines L1 and L2 or FIG. 5C. If the processing of step S107 is performed in this special circumstance, it will be mistakenly determined that an abnormality like that described above is occurring even though the water temperature sensor 16 is functioning normally.

In order to avoid such mistaken determination, the processing of step S106 is performed prior to the process of step S107 in the water temperature sensor abnormality diagnosis routine. In step S106, it is determined whether the change of the intake air temperature since engine start up begun is small. More specifically, it is determined whether the change of the intake air temperature is, for example, equal to or less than a predetermined value "d" illustrated by the solid line shown in FIG. 5B. For the predetermined value "d", it is possible to utilize a value that is extremely small as compared to the change amount of the intake air temperature following the beginning of engine start up in the case that the intake air temperature has fallen in the special circumstance described above. Note that, the determination processing of step S107 is performed in the case that a positive determination is made in step S106, or, in other words, is only performed in the case that the special circumstance described above does not exist.

Accordingly, in the special circumstance described above, the determination processing of step S107 is not performed. Thus, it is possible to avoid making a mistaken determination that an abnormality is occurring, which would occur if the determination processing of step S107 were performed in the special circumstance.

(ii) Explanation of Determination [2]

One example of the movement of the detection value of the water temperature sensor 16 in the case of an intermittent abnormality that is of a type that does not cause the detection value of the water temperature sensor 16 to change suddenly is a movement in which the detection value of the water temperature sensor 16 becomes lower than that the intake air temperature at that time even though warm up is proceeding following the beginning of start up of the engine 1. Note that, the engine 1 intakes surrounding air and combusts it along with fuel. Thus, normally, the coolant temperature of the engine 1 does not become lower than the intake air temperature and the above described movement of the detection value is not observed so long as the water temperature sensor 16 is functioning normally.

Figure 6:
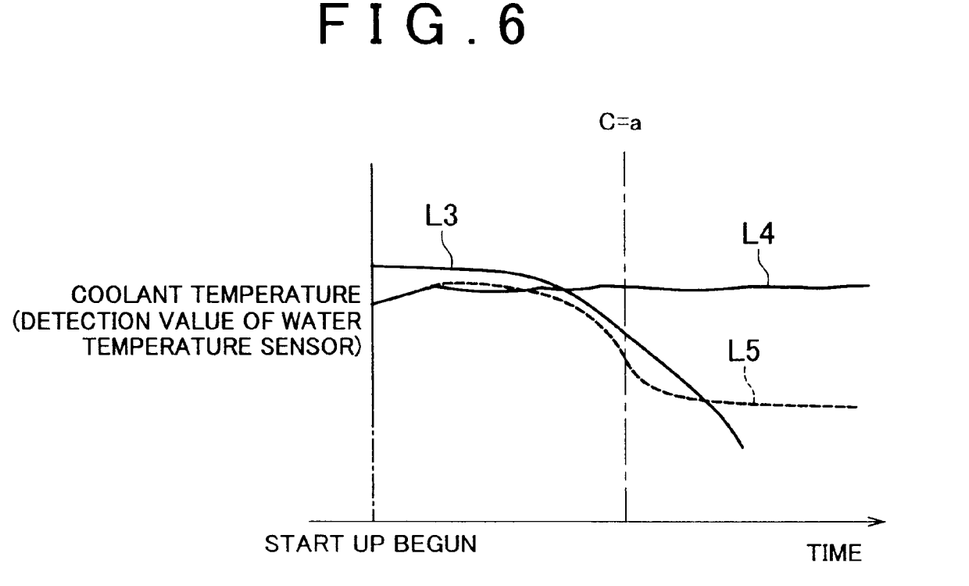
FIG. 6 is a time chart showing how the intake air temperature and the coolant temperature (the detection value of the water temperature sensor) move along with elapse of time when an abnormality of the water temperature sensor occurs.

In FIG. 6, the solid line L3 illustrates an example of the movement of the detection value of the water temperature sensor 16 that takes place when the above described abnormality occurs. Further, the solid line L4 in FIG. 6 illustrates the movement of the intake air temperature (more accurately, the detection value of the intake air temperature sensor 17), and is the movement that occurs in the case that the change amount is small after engine start up has begun. In addition, the dashed line L5 in FIG. 6 illustrates the movement of the intake air temperature as well, but in this case is the movement that occurs when the intake air temperature falls suddenly due to intake of cold air after engine start up has begun (as in the example described in [1] above).

If the movement of the detection value of the water temperature sensor 16 caused by the above described abnormality is like that shown by solid line L3, regardless of whether the movement of the intake air temperature is like that shown by the solid line L4 or like that shown by the dashed line L5, the detection value of the water temperature sensor 16 becomes lower than the intake air temperature. Accordingly, when the detection value of the water temperature sensor 16 has become lower than the intake air temperature, it can be determined that the above described abnormality is occurring in the water temperature sensor 16.

Given this fact, in the water temperature sensor abnormality diagnosis routine, in step S110 (FIG. 3) that is performed when either one of the determinations of steps S106 and S107 is negative, it is determined whether the detection value (the coolant temperature) of the water temperature sensor 16 is less than the intake air temperature by a predetermined value "f" or more. This determination is made to enable determination of the presence or not of the occurrence of the above described abnormality in the water temperature sensor 16. In the case that a positive determination is made in step S110, it can be determined that an intermittent abnormality is occurring in the water temperature sensor 16 and that this abnormality is of a type that does not cause the detection value of the water temperature sensor 16 to change suddenly. Note that, the predetermined abnormality f is a chosen value equal to or above "0", and is preset based on experimentation etc. to a value that is optimal from the point of view of performing the above described determination. Further, in the case that a positive determination is made in step S110, the routine immediately proceeds to step S108, where it is determined that an abnormality of the water temperature sensor 16 is occurring. Following this, the fail safe processing of step S109 is performed.

(iii) Explanation of Determination [3]

Figure 7:
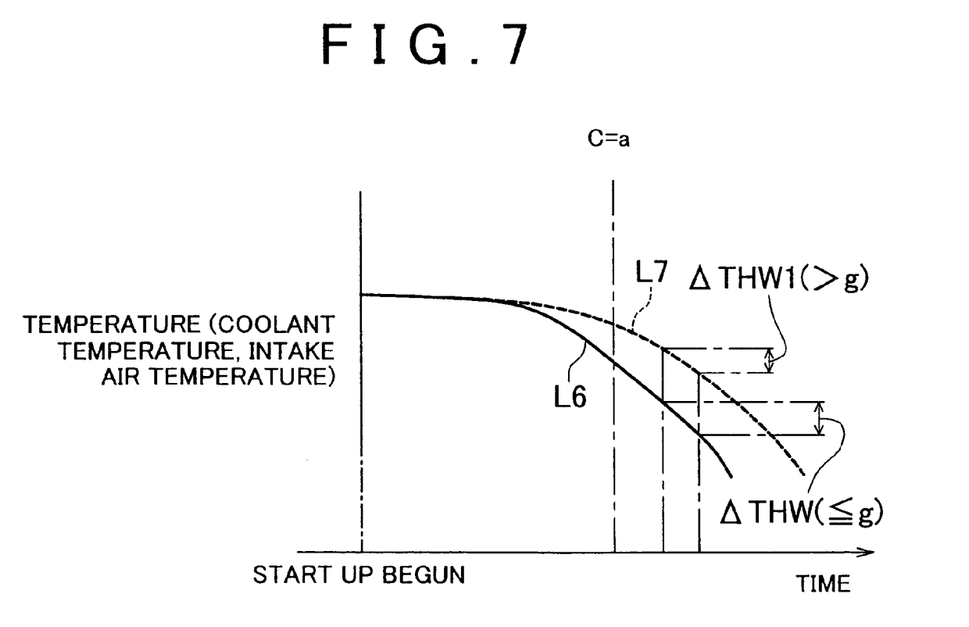
FIG. 7 is a time chart showing how the coolant temperature (the detection value of the water temperature sensor) moves along with elapse of time when an abnormality of the water temperature sensor occurs and the intake air temperature sudden falls.

In [1] above, one example was described of the movement of the detection value of the water temperature sensor 16 in the case of an intermittent abnormality that is of a type that does not cause the detection value of the water temperature sensor 16 to change suddenly is a movement in which the detection value of the water temperature sensor 16 becomes lower even though warm up is proceeding following the beginning of start up of the engine 1. The solid line L6 in FIG. 7 illustrates an example of this type of movement of the detection value of the water temperature sensor 16.

If the movement of the detection value of the water temperature sensor 16 is like that described above, the change amount of the detection value per unit time is a negative value. Accordingly, when the change amount of the detection value of the water temperature sensor 16 per unit time is a negative value, it can be determined that an abnormality of the water temperature sensor 16 like that described above is occurring.

Therefore, in the water temperature sensor abnormality diagnosis routine, in step S111 (FIG. 3) that is performed when the determination of step S110 is negative, it is determined whether the change amount of the detection value (the coolant temperature) of the water temperature sensor 16 per unit time is equal to or less than a predetermined negative value "g". This determination is made to enable determination of the presence or not of the above described abnormality in the water temperature sensor 16. Further, in the case that a positive determination is made in step S111, it can be determined that an intermittent abnormality is occurring in the water temperature sensor 16 and that this abnormality is of a type that does not cause the detection value of the water temperature sensor 16 to change suddenly. Thus, when the determination of step S111 is positive, the routine immediately proceeds to step S108, where it is determined that an abnormality of the water temperature sensor 16 is occurring. Following this, the fail safe processing of step S109 is performed.

However, in the special circumstance described in [1], the coolant temperature reduces along with reduction of the intake air temperature. Thus, even if the water temperature sensor 16 is functioning normally, it is possible for the detection value of the water temperature sensor 16 to reduce even though warm up of the engine 1 is proceeding. In FIG. 7, the dashed line L7 illustrates the movement of the detection value of the water temperature sensor 16 in this special circumstance. In such a special circumstance, the a positive determination is made in the determination processing of step S111 even though there is no abnormality of the water temperature sensor 16. Thus, there is a possibility that it will be mistakenly determined in step S108 (FIG. 2) that an abnormality of the water temperature sensor 16 is occurring.

In order to avoid such mistaken determination, the negative value "g" used in step S111 is set to a value that is even smaller than the smallest value that might conceivably be obtained for the change amount (negative value) of the detection value of the water temperature sensor 16 per unit time when the intake air temperature is reduced. With this configuration, when the water temperature sensor 16 is in a normal state and the coolant temperature has reduced to a maximum extent along with reduction in the intake air temperature, the detection value of the water temperature sensor 16 moves, for example, as shown by the dashed line L7 in FIG. 7. In this case, the change amount $\Delta THW1$ (negative value) of the detection value of the water temperature sensor 16 per unit time becomes the smallest value that might conceivably be obtained when the intake air temperature is reduced. However, the negative value "g" used in step S111 (FIG. 3) is set to a value that is even smaller than the change amount $\Delta THW1$. Note that, the absolute value of the negative value "g" is a value that is smaller than the predetermined value C1 obtained from Equation (1) used in the determination processing of step S104.

Thus, even if the detection value of the water temperature sensor 16 reduces while warm up is proceeding as a result of the special circumstance described above, the change amount of the detection value at that time does not reduce to less than the negative value "g". Accordingly, at this time, it is possible to avoid making in step S108 (FIG. 2) the mistaken determination that there is an abnormality of the water temperature sensor 16, which would occur if a positive determination were made in step S111.

On the other hand, on some occasions, if an abnormality like that described above occurs in the water temperature sensor 16, and the change amount of the detection value of the water temperature sensor 16 becomes smaller while warm up is proceeding, the change amount of the detection value reduces below the negative value "g". In this case, a positive determination is made in step S111 (FIG. 3). As a result, it is determined that an abnormality of the water temperature sensor 16 like that described above is occurring. One example of a case in which the change amount of the detection value of the water temperature sensor 16 reduces below the negative value "g" is a case where the detection value moves in the manner shown by the solid line L6 in FIG. 7. Here, the change amount of the detection value satisfies, "$\Delta THW (\leq g)$".

According to the embodiment described in detail above, the following effects can be obtained:

(1) Following the beginning of engine start up, if any one of determinations [1] to [3] is positive, namely, if any one of the determinations of steps S107, S110 or S111 is positive, the routine immediately proceeds to step S108 where it is determined that an abnormality of the water temperature sensor 16 is occurring. Accordingly, when an intermittent abnormality of the water temperature sensor 16 occurs and this and this abnormality is of a type that does not cause the detection value of the water temperature sensor 16 to change suddenly, it is possible to accurately diagnose that the abnormality is occurring in a short period of time following the beginning of engine start up.

(2) In determination [1], in the special circumstance described in [1], the coolant temperature reduces along with the reduction of the intake air temperature. Thus, it is conceivable that the detection value of the water temperature sensor 16 will become lower while warm up of the engine 1 is proceeding even though the water temperature sensor 16 is functioning normally. However, in determination of [1], when the change amount of the intake air is small following the beginning of engine start up (YES in S106), it is determined whether the detection value of the water temperature sensor 16 is smaller than that when engine start up began (S107). Thus, in the special circumstances, the determination of step S107 is not performed. Accordingly, it is possible to avoid the mistaken determination that an abnormality of the water temperature sensor 16 is occurring, which would occur if the determination processing of step S107 was performed in the special circumstances.

(3) In determination [3], in the special circumstance, the coolant temperature reduces along with reduction of the intake air temperature. Thus, even if the water temperature sensor 16 is functioning normally, the detection value of the water temperature sensor 16 reduces while warm up of the engine 1 is proceeding. Accordingly, it is possible that the change amount of the detection value (the coolant temperature) of the water temperature sensor 16 per unit time will become a negative value. In this case, the determination processing of step S111 is performed in which it is determined whether the change amount of the detection value (the coolant temperature) of the water temperature sensor 16 per unit time is equal to or less than the predetermined negative value "g". If the determination is positive, there is a possibility that it has mistakenly been determined that there is an abnormality occurring in the water temperature sensor 16. However, the predetermined negative value "g" is set to a value that is even smaller than the smallest value that might conceivably be obtained for the change amount (negative value) of the detection value of the water temperature sensor 16 per unit time when the intake air temperature is reduced. Thus, even if the detection value of the water temperature sensor 16 has reduced while warm up is proceeding as a result of the special circumstances described above, the change amount of the detection value per unit time does not reduce to less than the predetermined negative value "g". Accordingly, at this time, it is possible to avoid making the mistaken determination that an abnormality of the water temperature sensor 16 is occurring.

(4) With regard to intermittent abnormalities of the water temperature sensor 16 that are also abnormalities of a type that cause the detection value of the water temperature sensor 16 to change suddenly, it can be determined whether or not such an abnormality of the water temperature sensor 16 is occurring using the determination processing of step S104. Further, in the case of abnormalities that cannot be recognized by the determination processing of step S104, namely, abnormalities that do not cause the detection value of the water temperature sensor 16 to change rapidly, it is possible to use the determination processing of steps S105 to S107 and steps S110 to S111 to determine whether such an abnormality is occurring. Thus, regardless of whether an intermittent abnormality of the water temperature sensor 16 is (i) a type of abnormality that causes sudden change in the detection value of the water temperature sensor 16, or (ii) is a type of abnormality that does not cause sudden change of the detection value of the water temperature sensor 16, it is possible to accurately determine whether any of these abnormalities is occurring in a short period of time after engine start up has begun.

The above described embodiment may be modified, for example, in the following ways.

(a) It is not essential to perform the determination processing of step S104.

(b) It is not essential to perform the fail safe processing of step S109.

(c) There is no need to perform every one of determinations [1] to [3]. Just one or two of these determinations may be performed.

(d) Since the special circumstance described in [1] occurs very rarely, the processing of step S106 in determination [1] may be omitted.

(e) Bearing in mind that the special circumstance described in [1] occurs rarely, in determination [3], the predetermined negative value "g" may be set to a value larger than that in the above described embodiment, for example, "0" or a negative value closer to "0".

(f) In the above described embodiment, the invention is applied to the engine 1 in which the opening degree of the throttle valve 12 is adjusted for the idle speed control. However, the invention may be applied to an engine provided with an idle speed control valve that is separate from a throttle valve. An opening degree of the idle speed control valve may be adjusted for the idle speed control.

(g) In the above described embodiment, the invention is applied to the engine 1 in which the engine rotational speed is controlled during idling by adjusting the intake air amount. However, the invention may be applied to an engine, such as a diesel engine, in which an engine rotational speed is controlled during idling by adjusting a fuel injection amount.

What is claimed is:

1. An abnormality diagnosis apparatus, comprising:
   a water temperature sensor that detects a coolant temperature of an internal combustion engine; and
   a controller that determines whether an abnormality of the water temperature sensor is occurring based on if, after start up of the internal combustion engine has begun, a detection value of the water temperature sensor has become a value lower than that when start up began,
   wherein abnormality determination by the controller is only performed when a change in the amount of an intake air temperature of the internal combustion engine is small.

2. The abnormality diagnosis apparatus according to claim 1, wherein, the controller determines whether an abnormality of the water temperature sensor is occurring based on if the detection value of the water temperature sensor changes suddenly.

3. An abnormality diagnosis method for a water temperature sensor that detects a coolant temperature of an internal combustion engine, comprising:
   determining whether an abnormality of the water temperature sensor is occurring based on if, after start up of the internal combustion engine has begun, a detection value of the water temperature sensor has become a value lower than that when start up began,
   wherein abnormality determination is only performed when a change of an intake air temperature of the internal combustion engine is small.

4. The abnormality diagnosis method according to claim 3, further comprising:
   determining whether an abnormality of the water temperature sensor is occurring based on if the detection value of the water temperature sensor changes suddenly.

* * * * *